(12) United States Patent
Chung

(10) Patent No.: US 9,078,404 B2
(45) Date of Patent: Jul. 14, 2015

(54) AUTOMATIC AGRICULTURAL CULTIVATING EQUIPMENT WITH A LOADING UNIT ROTATABLE ABOUT A VERTICAL AXIS

(71) Applicant: Fung Gin Da Energy Science and Technology Co., Ltd., Pingtung County (TW)

(72) Inventor: Chun-Neng Chung, Pingtung County (TW)

(73) Assignees: Tung-Jui Chang, Pingtung County (TW); Pi-Hsia Lin, Kaohsiung (TW)

( * ) Notice: Subject to any disclaimer, the term of this patent is extended or adjusted under 35 U.S.C. 154(b) by 131 days.

(21) Appl. No.: 13/742,802

(22) Filed: Jan. 16, 2013

(65) Prior Publication Data

US 2014/0196363 A1    Jul. 17, 2014

(51) Int. Cl.
*A01G 31/02* (2006.01)
*A01G 31/04* (2006.01)

(52) U.S. Cl.
CPC .................................. *A01G 31/047* (2013.01)

(58) Field of Classification Search
USPC ............ 47/1.7, 17, 65, 65.5, 66.1, 66.5, 66.6, 47/66.7, 83, 86, 79, 82, 48.5, 39, 58.1 LS, 47/58.1 FV, 59 R, 60, 61, 62 R, 62 A, 62 C, 47/62 N, 62 E, 63
See application file for complete search history.

(56) References Cited

U.S. PATENT DOCUMENTS

| | | | | |
|---|---|---|---|---|
| 2,897,631 A | * | 8/1959 | Howsley, Jr. et al. | 47/60 |
| 3,909,978 A | * | 10/1975 | Fleming | 47/82 |
| 4,085,544 A | * | 4/1978 | Blake | 47/39 |
| 4,250,666 A | * | 2/1981 | Rakestraw | 47/83 |
| 4,258,501 A | * | 3/1981 | Brown | 47/16 |
| 5,515,648 A | * | 5/1996 | Sparkes | 47/65 |
| 5,617,673 A | * | 4/1997 | Takashima | 47/60 |
| 5,862,628 A | * | 1/1999 | Takashima | 47/65.8 |
| 6,061,957 A | * | 5/2000 | Takashima | 47/66.1 |
| 6,604,321 B2 | * | 8/2003 | Marchildon | 47/62 R |
| 6,840,007 B2 | * | 1/2005 | Leduc et al. | 47/62 C |

(Continued)

FOREIGN PATENT DOCUMENTS

| | | |
|---|---|---|
| CN | 2342582 Y | 10/1999 |
| CN | 101702937 A | 5/2010 |

(Continued)

OTHER PUBLICATIONS

The Search Report appended in an Office Action issued to Taiwanese Counterpart Application No. 101126618 by the Taiwan Intellectual Property Office on Jun. 27, 2014, along with an English translation thereof.

(Continued)

*Primary Examiner* — Trinh Nguyen
(74) *Attorney, Agent, or Firm* — LeClairRyan

(57) ABSTRACT

An automatic agricultural cultivating equipment includes a supporting unit, a rotating unit, a driving unit, a loading unit, an operating unit, and a supply unit. The rotating unit is driven by the driving unit to rotate on the supporting unit about a vertical axis, and defines an operation region and a cultivation region. The loading unit includes a plurality of loading plates disposed on the rotating unit and in the cultivation region. The supply unit is disposed on the rotating unit for supplying water and light to the loading unit.

10 Claims, 13 Drawing Sheets

(56) References Cited

U.S. PATENT DOCUMENTS

| | | | |
|---|---|---|---|
| 7,549,250 B2* | 6/2009 | Feuz | 47/60 |
| 2002/0144461 A1* | 10/2002 | Marchildon | 47/65.5 |
| 2004/0111965 A1* | 6/2004 | Agius | 47/62 R |
| 2005/0011119 A1* | 1/2005 | Bourgoin et al. | 47/61 |
| 2005/0039396 A1* | 2/2005 | Marchildon | 47/62 E |
| 2005/0039397 A1* | 2/2005 | Roy | 47/62 R |
| 2005/0055878 A1* | 3/2005 | Dumont | 47/62 R |
| 2007/0251145 A1* | 11/2007 | Brusatore | 47/83 |
| 2009/0151244 A1* | 6/2009 | Jesness, III | 47/65 |
| 2009/0165373 A1* | 7/2009 | Souvlos et al. | 47/65 |
| 2010/0236147 A1* | 9/2010 | Brusatore | 47/59 R |
| 2011/0130871 A1* | 6/2011 | Lin | 700/219 |
| 2012/0124904 A1* | 5/2012 | Marchildon | 47/65 |
| 2014/0182197 A1* | 7/2014 | Chung | 47/1.7 |

FOREIGN PATENT DOCUMENTS

| | | |
|---|---|---|
| CN | 202184024 | 4/2012 |
| CN | 202222192 U | 5/2012 |
| TW | 519871 | 2/2003 |
| TW | 200948264 | 12/2009 |

OTHER PUBLICATIONS

References Cited from a Search Report appended to an Office Action issued to Chinese counterpart application No, 201210321278.X by the State Intellectual Property Office of the P.R.C. on Dec. 2, 2014, including the relevant Search Report and English translation thereof, as well as English abstracts of each cited reference.

* cited by examiner

AUTOMATIC AGRICULTURAL CULTIVATING EQUIPMENT WITH A LOADING UNIT ROTATABLE ABOUT A VERTICAL AXIS

BACKGROUND OF THE INVENTION

1. Field of the Invention

This invention relates to agricultural cultivating equipment, and more particularly to automatic agricultural cultivating equipment including a loading unit rotatable about a vertical axis.

2. Description of the Related Art

Referring to FIGS. 1 and 2, conventional agricultural cultivating equipment disclosed in Taiwanese Utility Model Republication No. M417868 is used for cultivating and producing crops. The conventional agricultural cultivating equipment includes two spaced-apart primary supports 12, two secondary supports 12 disposed respectively at left and right sides of an assembly of the main supports 11, a plurality of flowerpots 13 (only one is shown in FIG. 1) hung on the secondary supports 12, two water collecting reservoirs 14 each disposed under a vertical row of the flowerpots 13, two water pumps 15 (only one is shown in FIG. 1) disposed respectively in the water collecting reservoirs 14, a plurality of lighting members 16 disposed between the primary supports 11, a light transmissive plate 17 disposed on and above the main supports 11 and the secondary supports 12, a light reflecting plate 18 connected to bottom ends of the main plates 11 and the secondary plates 12, and two water conduits 19 (only one is shown in FIG. 1) connected respectively to the pumps 15.

During watering, the pumps 15 are operated to draw water from the water collecting reservoirs 14. Hence, the water flows through the water conduits 19 into the uppermost flowerpots 13, and drop into the remaining flowerpots 13. When the lowermost flowerpots 13 are filled with water, redundant water flows from discharge holes (not shown) in bottom ends of the lowermost flower pots 13 into the water collecting reservoirs 14. To light the crops, the lighting members 15 are actuated, and sunlight is emitted onto the flowerpots 13 through the light transmissive plate 17. In addition, the light emitted from the lighting members 15 and the sunlight passing through the light transmissive plate 17 onto the light reflecting plate 18 can be reflected by the light reflecting plate 18. As such, a space defined between the primary supports 11 and between the secondary plates 12 is full of light.

By hanging the flowerpots 13 on the secondary supports 12, the aforesaid conventional agricultural cultivating equipment is suitable for mass production. However, since water flows from the uppermost flowerpots 13 into the lowermost flowerpots 13, the conventional agricultural cultivating equipment suffers from the following disadvantages:

(1) When water drops along the flowerpots 13, distribution of water in the flowerpots 13 is non-uniform. For example, since water flows continuously through the cultivating soil in the uppermost flowerpots 13, the cultivating soil in the uppermost flowerpots 13 lacks sufficient nutrient, and redundant fertilizer and metabolite are accumulated eventually within the lowermost flowerpots 13, which is harmful to the crops in the lowermost flowerpots 13.

(2) It is necessary for the user to move frequently between the primary supports 11 and between the secondary supports 12, thereby resulting in consumption in time and manpower.

(3) It is difficult to manage and harvest the crops in the flowerpots 13 disposed on upper end portions of the secondary supports 12.

SUMMARY OF THE INVENTION

The object of this invention is to provide rotary type agricultural cultivating equipment that can overcome the aforesaid disadvantages associated with the prior art.

Agricultural cultivating equipment of this invention is adapted for cultivating crops, and includes a supporting unit, a rotating unit, a driving unit, a loading unit, an operating unit, a supply unit, and a control unit.

The rotating unit is disposed rotatably on the supporting unit, is rotatable about a vertical axis, and has an inner annular portion, an outer annular portion disposed around and connected to the inner annular portion, an operation region defined in the inner annular portion, and a cultivation region defined between the inner and outer annular portions.

The driving unit is connected to the rotating unit for driving rotation of the rotating unit relative to the supporting unit.

The loading unit includes a plurality of loading plates disposed on the rotating unit and in the cultivation region and spaced vertically apart from each other, and a plurality of loading tray assemblies disposed respectively on the loading plates and each including a plurality of loading trays adapted to permit the crops to be planted therein. The loading plates are co-rotatable with the rotating unit.

An operating unit is disposed on the supporting unit and in the operation region of the rotating unit, and is adapted to permit a user to move from the supporting unit onto a selected one of the loading plates therethrough for performing a cultivating operation on the crops.

A supply unit including a water supplying device disposed on the rotating unit for spraying water into the loading trays of the loading unit, and a plurality of lighting members disposed on the rotating unit for lighting the loading trays of the loading unit.

The control unit is electrically connected to the rotating unit, the driving unit, the loading unit, the operating unit, and the supply unit, and is operable for controlling operation of the rotating unit, the driving unit, the loading unit, the operating unit, and the supply unit.

Since the loading trays can be spaced vertically apart from each other, the cultivating area corresponding to a limited ground surface can be increased.

Furthermore, the loading trays can co-rotate with the rotating unit to provide homogeneous growth conditions of the crops, and easy management and harvest of the crops.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
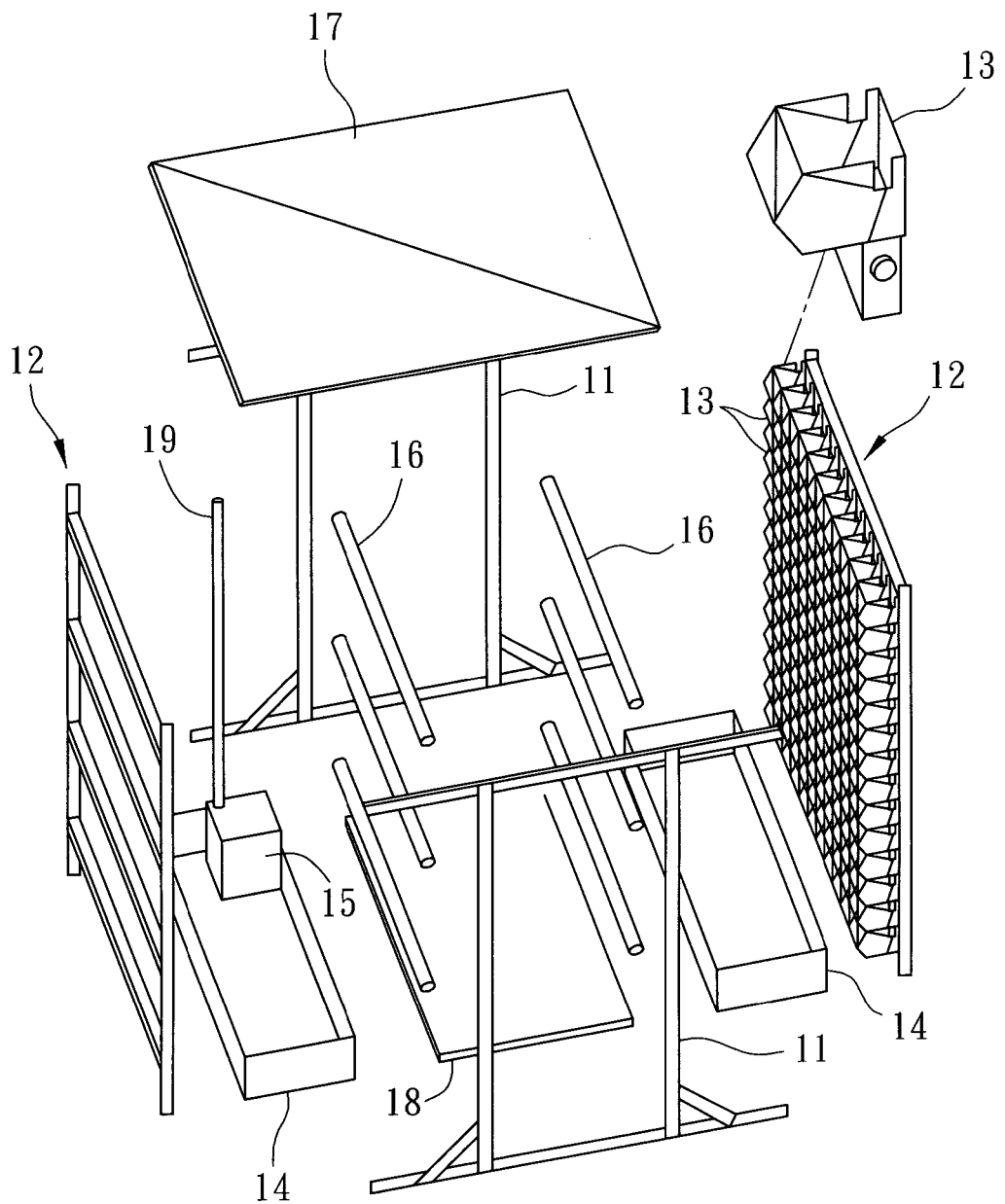
FIG. 1 is an exploded perspective view of conventional agricultural cultivating equipment disclosed in Taiwanese Utility Model Patent Publication No. 417868.
Figure 2:
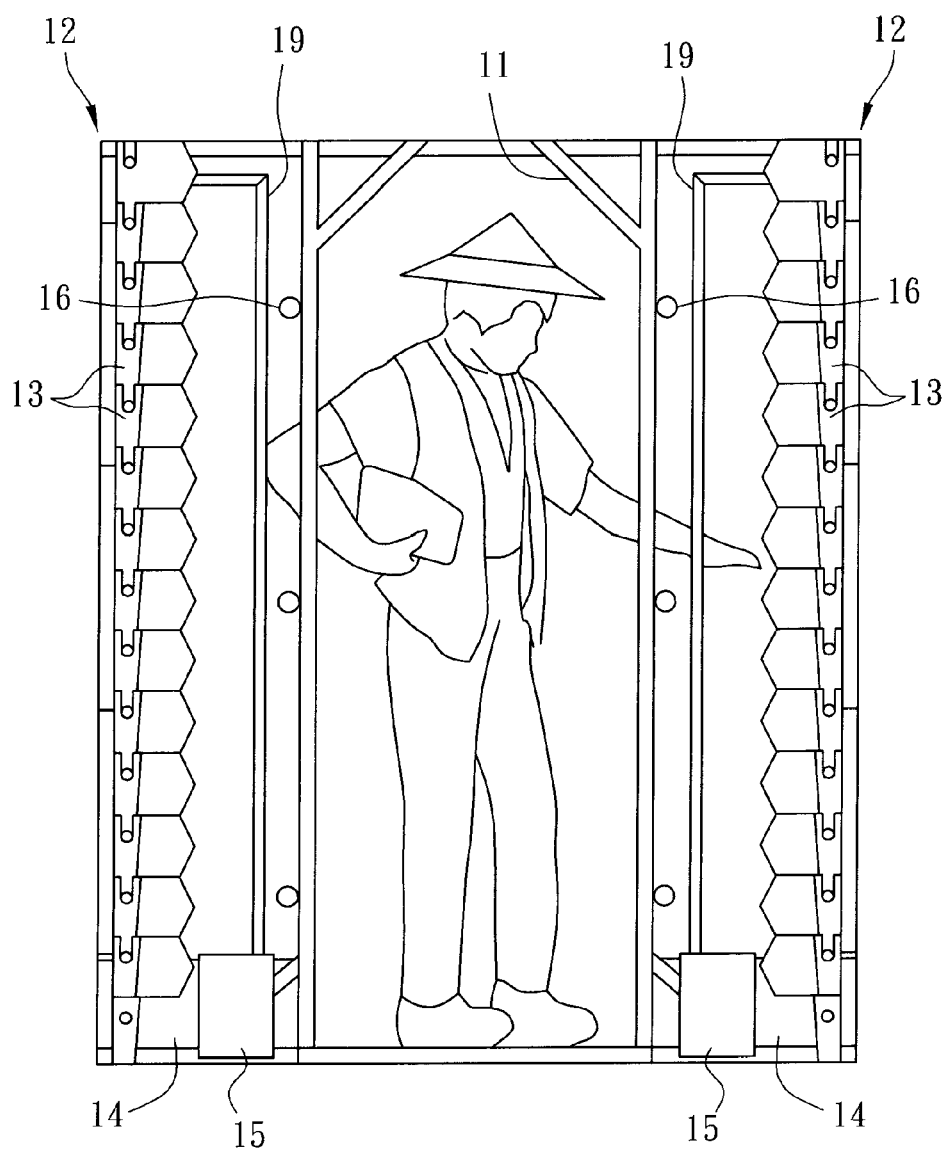
FIG. 2 is a schematic view illustrating use of the conventional agricultural cultivating equipment.

Before the present invention is described in greater detail in connection with the preferred embodiments, it should be noted that similar elements and structures are designated by like reference numerals throughout the entire disclosure.

Figure 3:
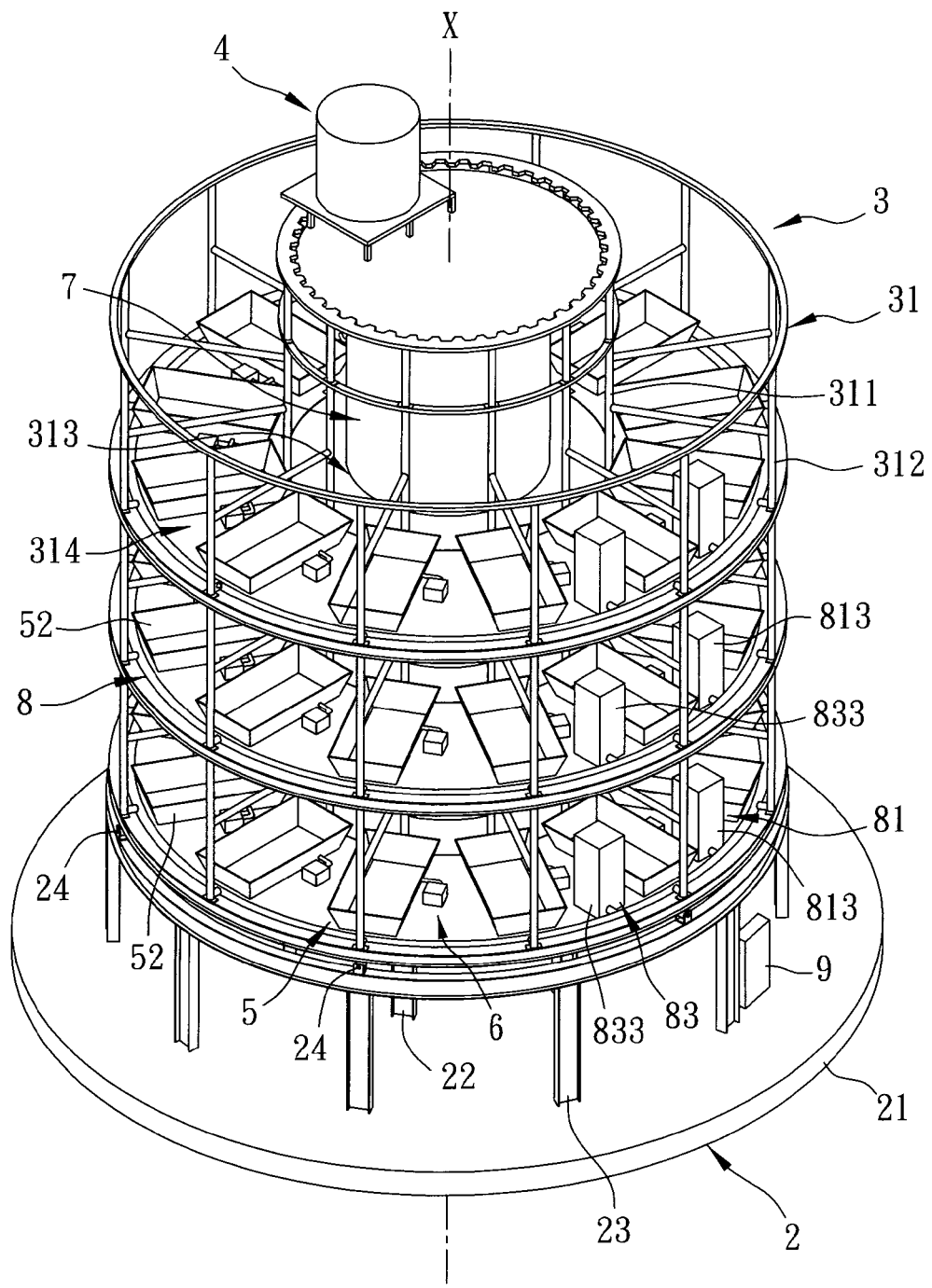
FIG. 3 is a perspective view of the first preferred embodiment of rotary type automatic agricultural cultivating equipment according to this invention, a minority of the components being removed for convenience of illustration.

Referring to FIG. 3, the first preferred embodiment of rotary type automatic agricultural cultivating equipment according to this invention includes a supporting unit 2, a rotating unit 3 disposed rotatably on the supporting unit 2 and rotatable about a vertical axis (X), a driving unit 4 disposed on the rotating unit 3 for driving rotation of the rotating unit 3, a loading unit 5 disposed on the rotating unit 3, a collecting unit 6 connected to the loading unit 5, an operating unit 7 extending through the supporting unit 2 and the rotating unit 3, a supply unit 8 disposed on the rotating unit 3, and a control unit 9 electrically connected to the rotating unit 3, the driving unit 4, the loading unit 5, the operating unit 7, and the supply unit 8 for controlling operation of the rotating unit 3, the driving unit 4, the loading unit 5, the operating unit 7, and the supply unit 8.

Figure 4:
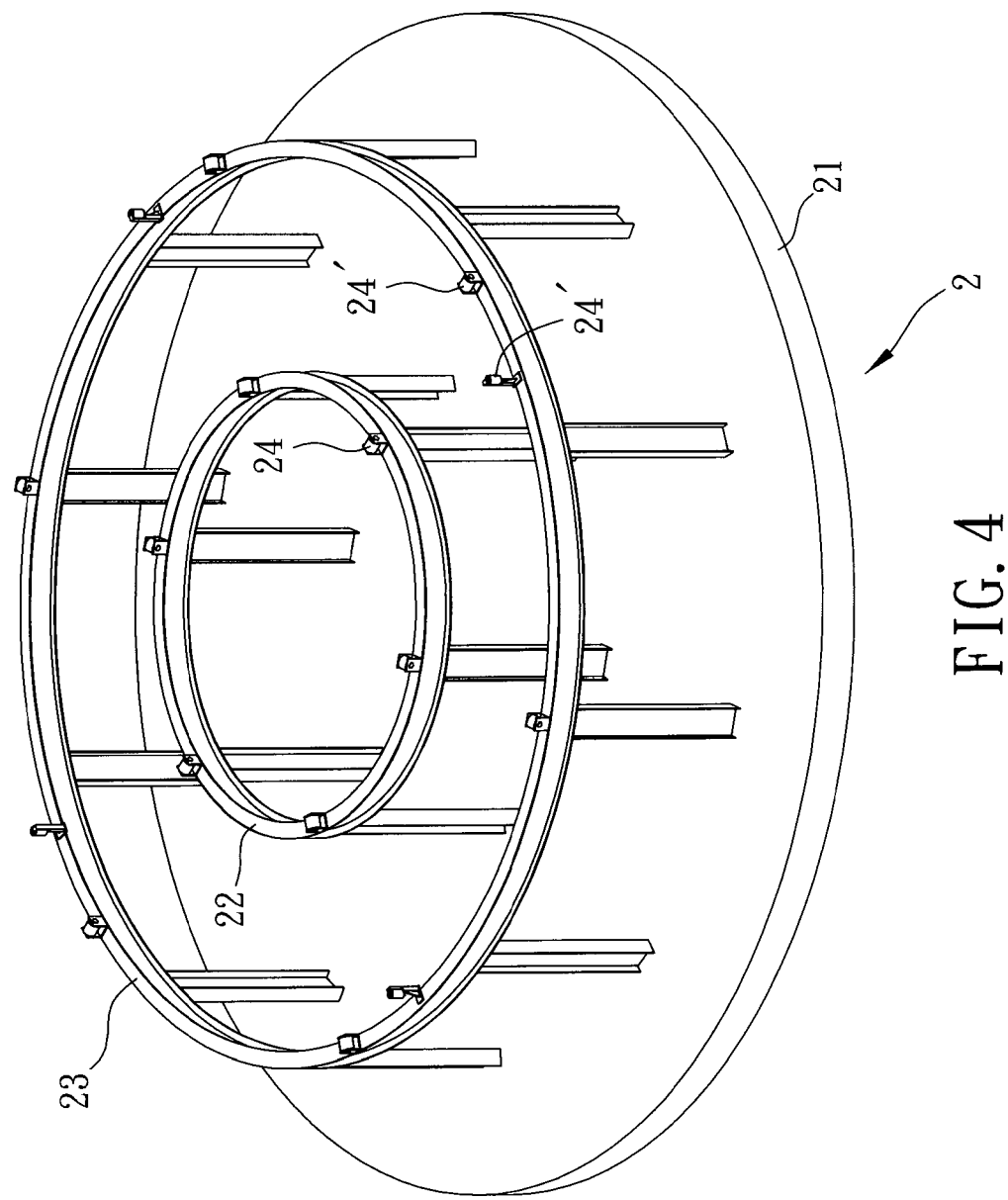
FIG. 4 is a perspective view of a supporting unit of the first preferred embodiment.

With further reference to FIG. 4, the supporting unit 2 includes a bottom seat 21, an annular central frame 22 disposed fixedly on the bottom seat 21, a surrounding frame 23 disposed fixedly on the bottom seat 21 and disposed around and spaced apart from the central frame 22, a plurality of first rollers 24 disposed on the central frame 22, and a plurality of second rollers 24 disposed on the surrounding frame 23. The central axis of each of the first rollers 24 disposed on the central frame 22 is horizontal. The central axes of some of the second rollers 24' are horizontal, while the central axes of the remaining second rollers 24' are vertical.

With particular reference to FIG. 3, the rotating unit 3 includes an inner annular portion 311 disposed rotatably on the central frame 22 by the first rollers 24, an outer annular portion 312 disposed rotatably on the surrounding frame 23 by the second rollers 24', an operation region 313 defined in the inner annular portion 311, and a cultivation region 314 defined between the inner and outer annular portions 311, 312.

Figure 5:
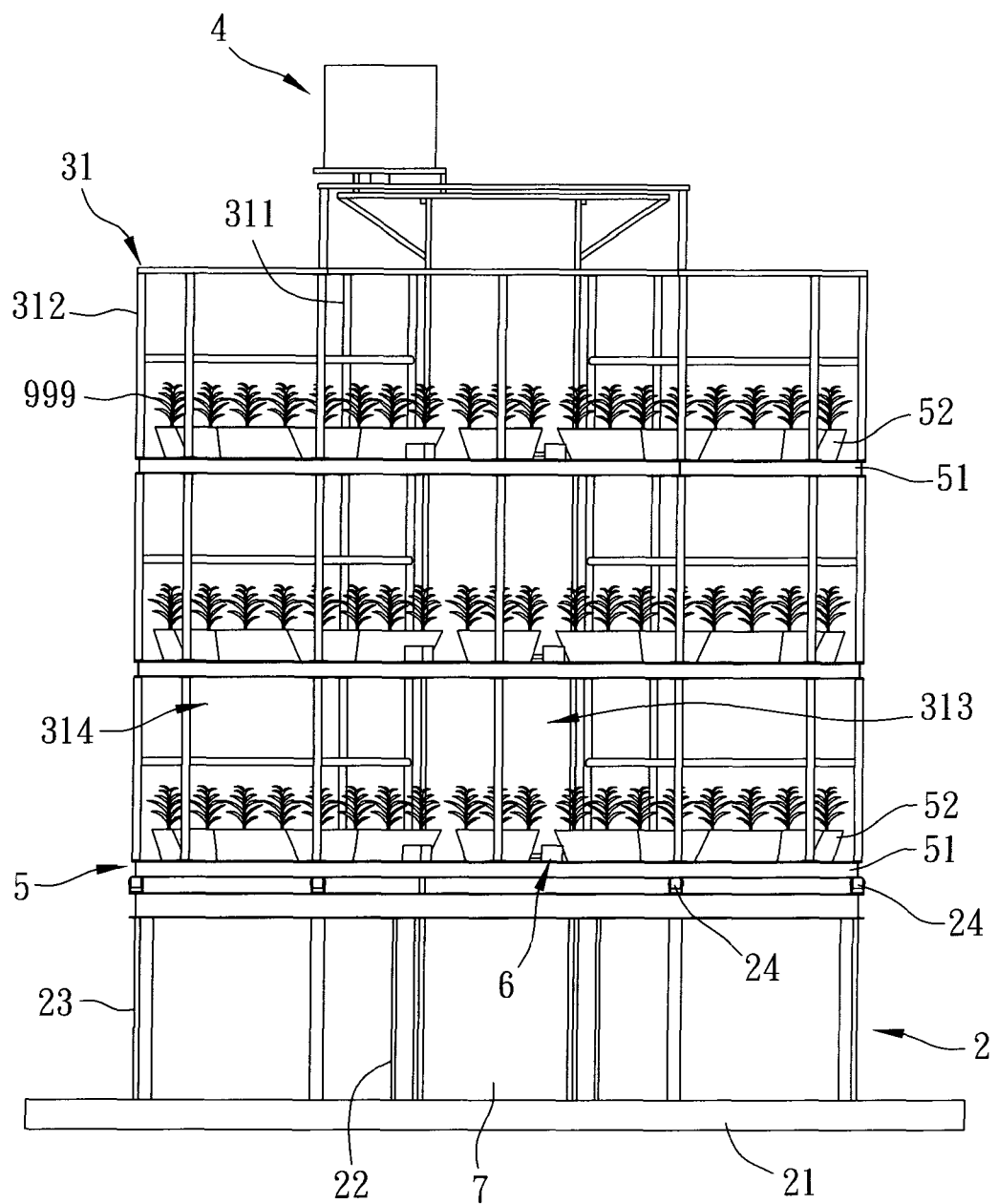
FIG. 5 is a front view of the first preferred embodiment, a minority of the component being removed for convenience of illustration.
Figure 6:
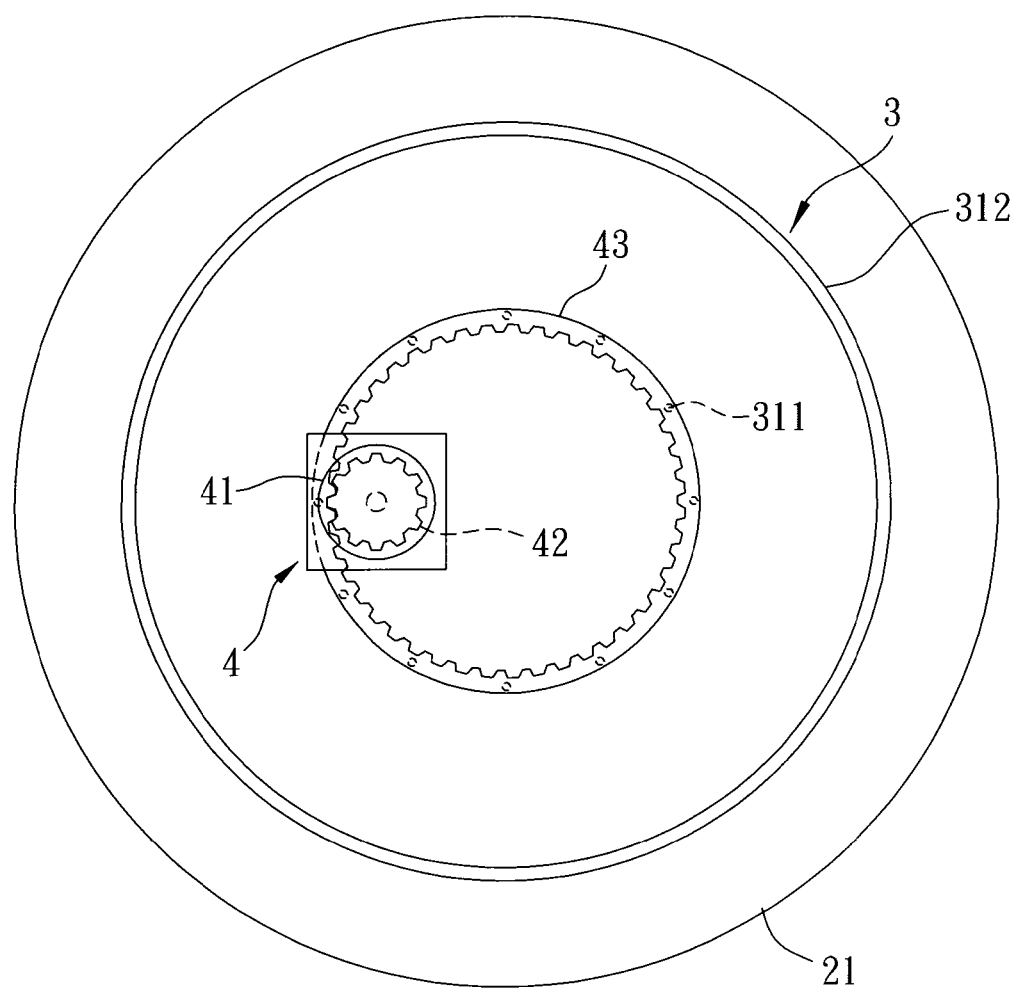
FIG. 6 is a top view of a driving unit and a rotating unit of the first preferred embodiment.

With particular reference to FIGS. 4, 5, and 6, the driving unit 4 includes a motor 41, a driving gear 42 driven by the motor 41, and an internal gear 43 connected fixedly to the inner annular portion 311 and meshing with the driving gear 42 so as to transfer rotation of the driving gear 42 to the rotating unit 3. Due to the presence of the first and second rollers 42, 42', friction between the rotating unit 3 and the supporting unit 2 is reduced, thereby facilitating smooth rotation of the rotating unit 3. Furthermore, the second rollers 24' having vertical central axes can prevent reclination and deformation of the rotating unit 3.

Figure 7:
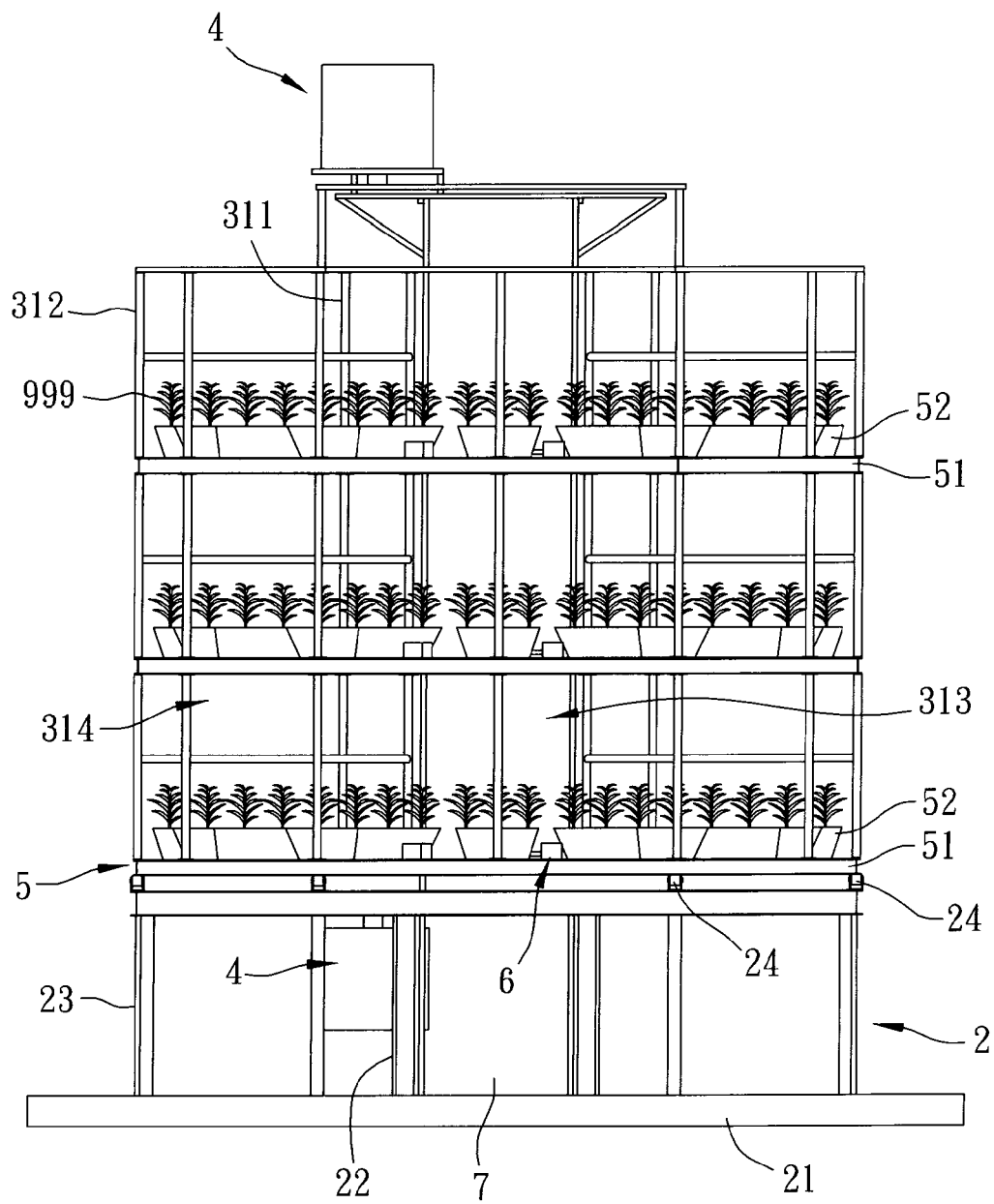
FIG. 7 is a front view of the first preferred embodiment, illustrating an additional driving unit.

It should be noted that, in this embodiment, an additional driving unit 4 may be added, as shown in FIG. 7, such that the two driving units 4 are spaced vertically apart from each other. As such, if one of the driving units 4 malfunctions, the other of the driving units 4 can drive the rotating unit 3 to rotate.

Figure 8:
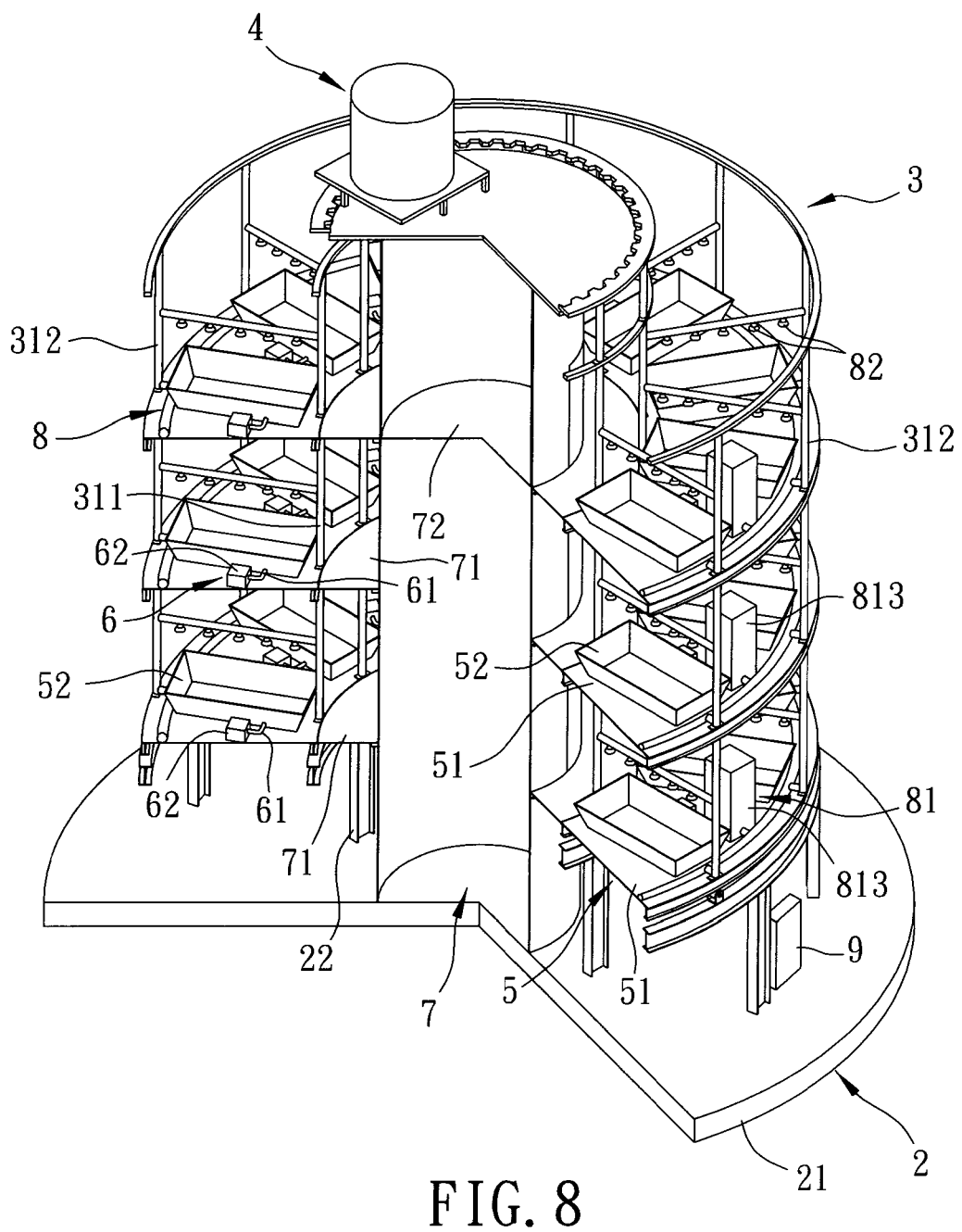
FIG. 8 is a view similar to FIG. 3, a portion being cut away for convenience of illustration.

With particular reference to FIGS. 5 and 8, the loading unit 5 includes a plurality of vertically spaced-apart loading plates 51 disposed on the rotating unit 3 and in the cultivation region 314 and co-rotatable with the rotating unit 3, and a plurality of loading tray assemblies disposed respectively on the loading plates 51 and each including a plurality of loading trays 52 permitting crops 999 to be planted therein. The operating unit 7 is disposed in the central frame 22 of the supporting unit 2 and the operation region 313 of the rotating unit 3, and includes a plurality of spaced-apart platforms 71 disposed in the operation region 313 and adjoining respectively the loading plates 51, and an elevator 72 for transporting the user onto a selected one of the platforms 71.

Figure 9:
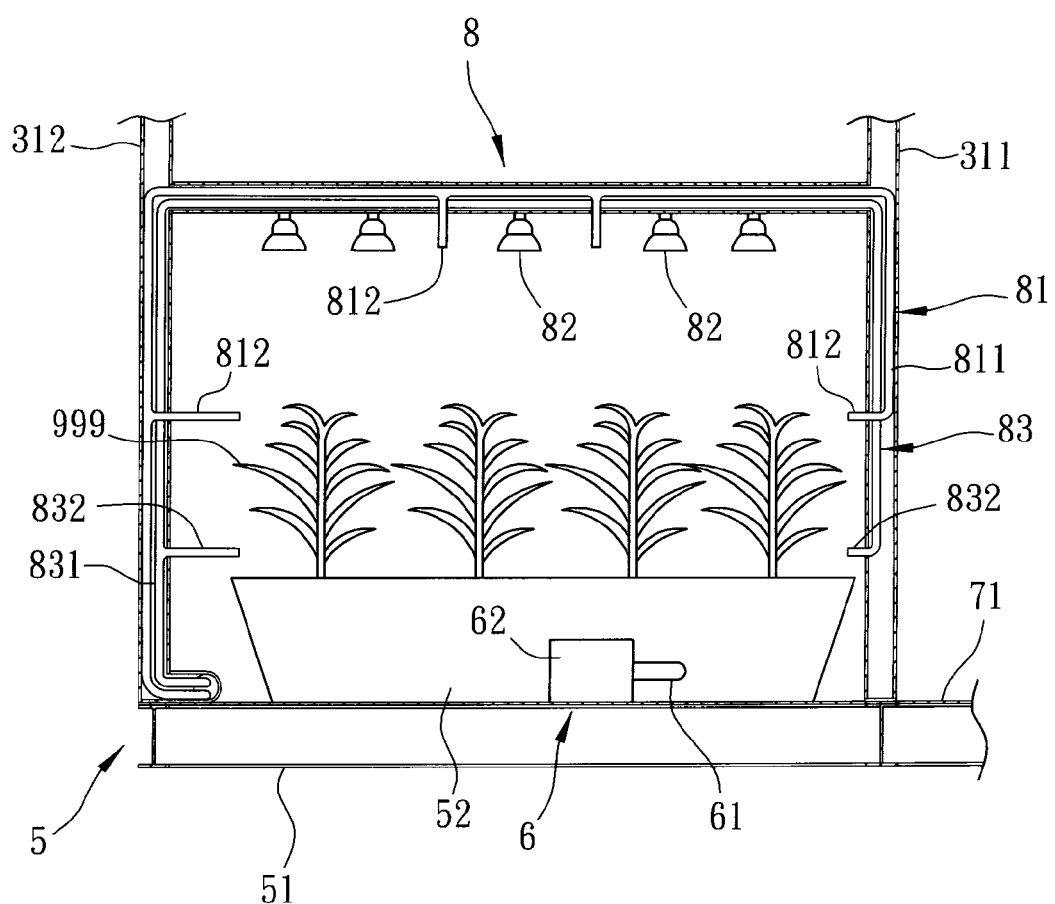
FIG. 9 is a fragmentary sectional view of the first preferred embodiment, illustrating relationship between a supply unit and a loading unit.

With particular reference to FIGS. 3 and 9, the supply unit 8 includes a water supplying device 81 disposed on the rotating unit 3, a plurality of lighting members 82 disposed on the rotating unit 3 for lighting the loading trays 52 of the loading unit 5, and a fertilizer supplying device 83 disposed on the rotating unit 3. The water supplying device 81 includes a plurality of water conduits 811 (only one is shown in FIG. 9) disposed on the rotating unit 31 for guiding water flow, a plurality of water spraying members 812 in spatial communication with the water conduits 811 for spraying water into the loading trays 52, and a plurality of water drawing members 813 for drawing water from a water source (not shown) into the water conduits 811. The fertilizer supplying device 83 includes a plurality of fertilizer conduits 831 (only one is shown in FIG. 9) disposed on the rotating unit 3 for guiding fertilizer flow, a plurality of fertilizer dispensing members 832 in spatial communication with the fertilizer conduits 831 for spraying fertilizer into the loading trays 52, and a plurality of fertilizer drawing members 833 for drawing fertilizer from a fertilizer source (not shown) into the fertilizer conduits 831.

With further reference to FIGS. 8 and 9, the first preferred embodiment further includes a collecting unit 6. The collecting unit 6 includes a plurality of collecting tubes 61 connected respectively to the loading trays 52, and a plurality of collectors 62 connected respectively to the collecting tubes 61 and disposed respectively on the loading plates 51. Due to the design of the collecting tubes 61, redundant water can flow from the loading trays 52 into the collectors 62 via the collecting tubes 61. The redundant water received in the collectors 62 may contain fertilizer, nutrient, metabolite, microorganism, bacteria, and cultivating soil, and can be analyzed to enable the user to realize the growth conditions of the crops 999. Alternatively, a plurality of soil sampling devices (not shown) may be disposed respectively in the loading trays 52. If this occurs, the redundant water can be delivered to the collectors 62 through the collecting tubes 61 for further analysis and use.

Figure 10:
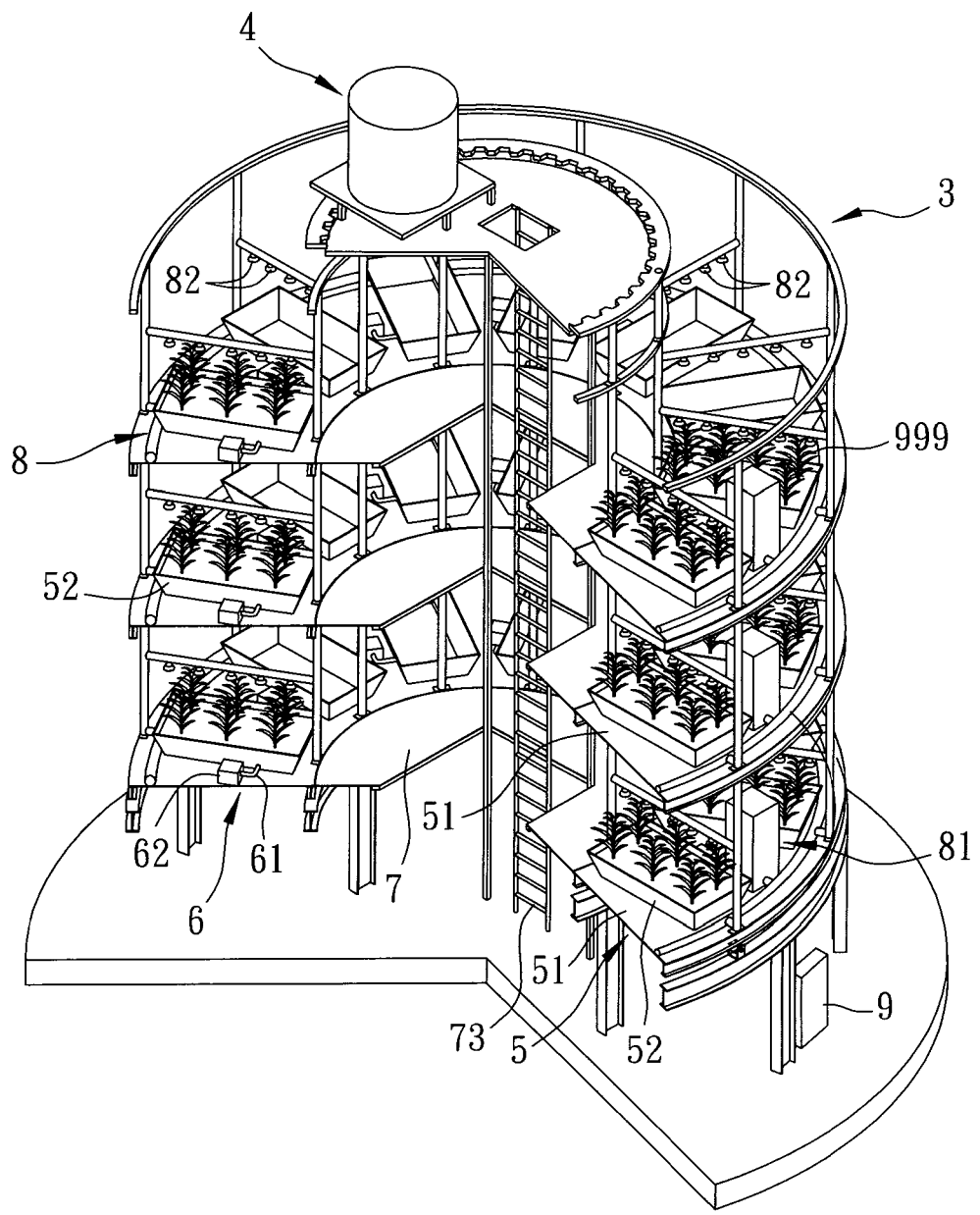
FIG. 10 is a schematic view illustrating a modification to an operating unit of the first preferred embodiment.

With particular reference to FIGS. 8 and 10, when it is desired to cultivate the crops 999, the crops 999 are first transported onto the loading plates 51 by means of the elevator 72 of the operating unit 7. Next, the control unit 9 is operated to activate the driving unit 4 to thereby rotate the rotating unit 3. At this time, the user stands on the platforms 71 individually to plant the crops 999 in the loading trays 52. Afterwards, the control unit 9 is operated to control the water supplying device 81, the fertilizer supplying device 83 (see FIG. 3), and the lighting members 82 of the supply unit 8, e.g., by setting watering time, sprayed water amount, light intensity, lighting time, lighting angle, sprayed fertilizer amount, and water sprayed positions according to the plant variety of the crops 999, to supply necessities for growth of the crops 999. During growth of the crops 999, the collecting unit 6 can be used to discharge water or collect redundant water for scientific analysis to realize the growth conditions of the crops 999.

It should be noted that, with further reference to FIG. 10, the operating unit 7 shown in FIG. 8 and including the platforms 71 and the elevator 72 may be modified to include only a ladder 73 interconnecting the loading plates 51.

Figure 11:
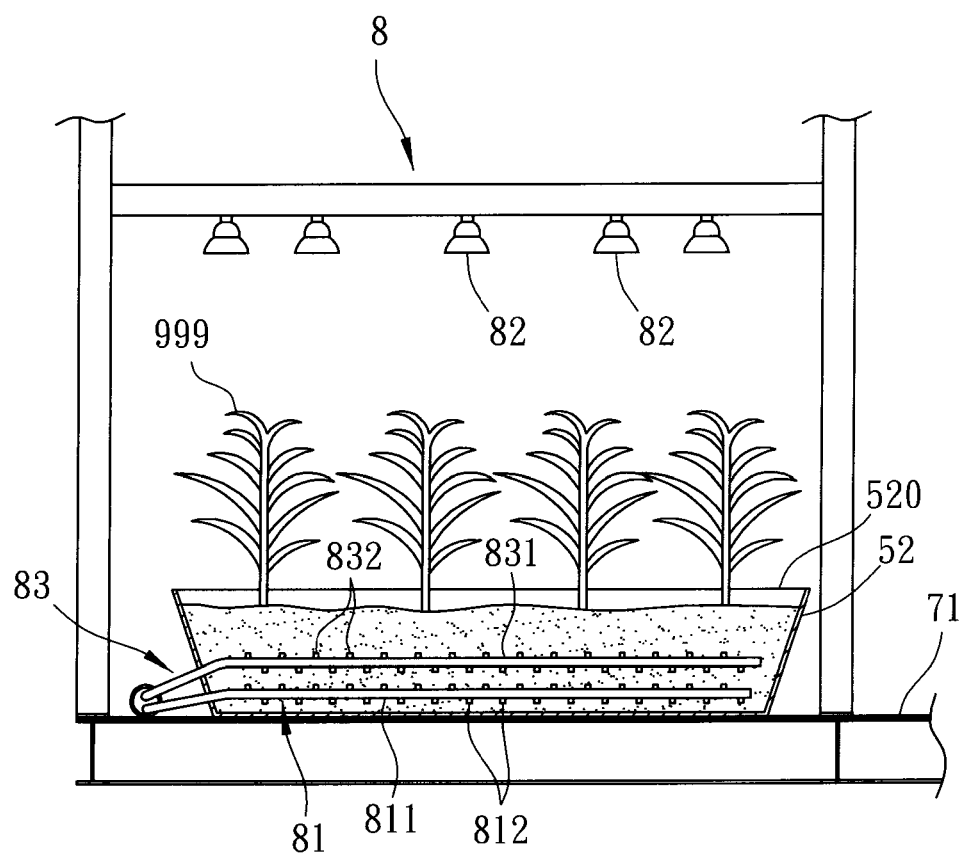
FIG. 11 is a fragmentary sectional view of the first preferred embodiment, illustrating a modification to the supply unit.

To conform with the crops 999 absorbing water and fertilizer at the root portions thereof, with further reference to FIG. 11, the positions of the water conduits 811, the water spraying members 812, the fertilizer conduits 831, and the fertilizer dispensing members 832 maybe adjusted, such that the the water conduits 811 extend respectively into the loading trays 52, the water spraying members 812 are disposed respectively in the loading trays 52, the fertilizer conduits 831 extend respectively into the loading trays 52, and the fertilizer dispensing members 832 are disposed respectively in the loading trays 52. In this manner, consumption of water and fertilizer can be avoided.

Figure 12:
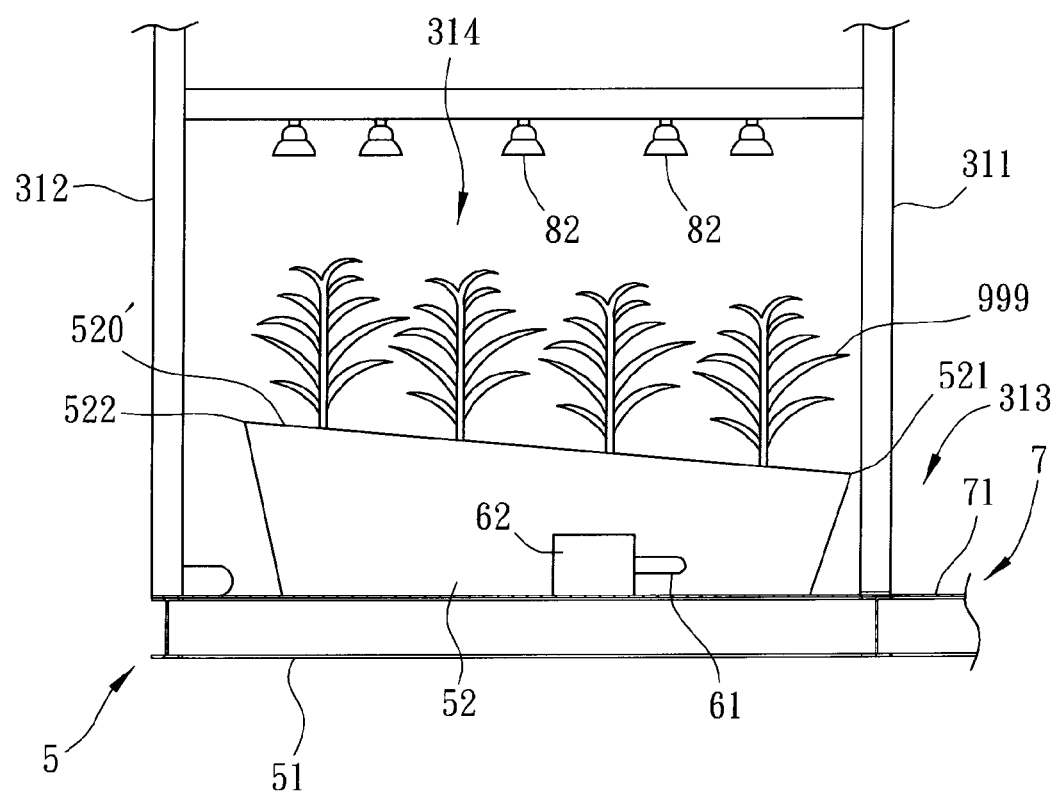
FIG. 12 is a fragmentary sectional view of the first preferred embodiment, illustrating a modification to the loading unit.

In this embodiment, with particular reference to FIG. 11, the top surface 520 of each of the loading trays 52 is horizontal. With further reference to FIG. 12, alternatively, the top surface 520' of each of the loading trays 52 is an inclined surface, and has an inner end 521 proximate to the operating unit 7, and an outer end 522 distal from the operating unit 7 and higher than the inner end 521. As such, when the user stands on the corresponding platform 71, he or she can see the growth conditions of the crops 999 on the cultivating soil in the loading trays 52. As such, the crops are convenient to cultivate, manage, and harvest.

Figure 13:
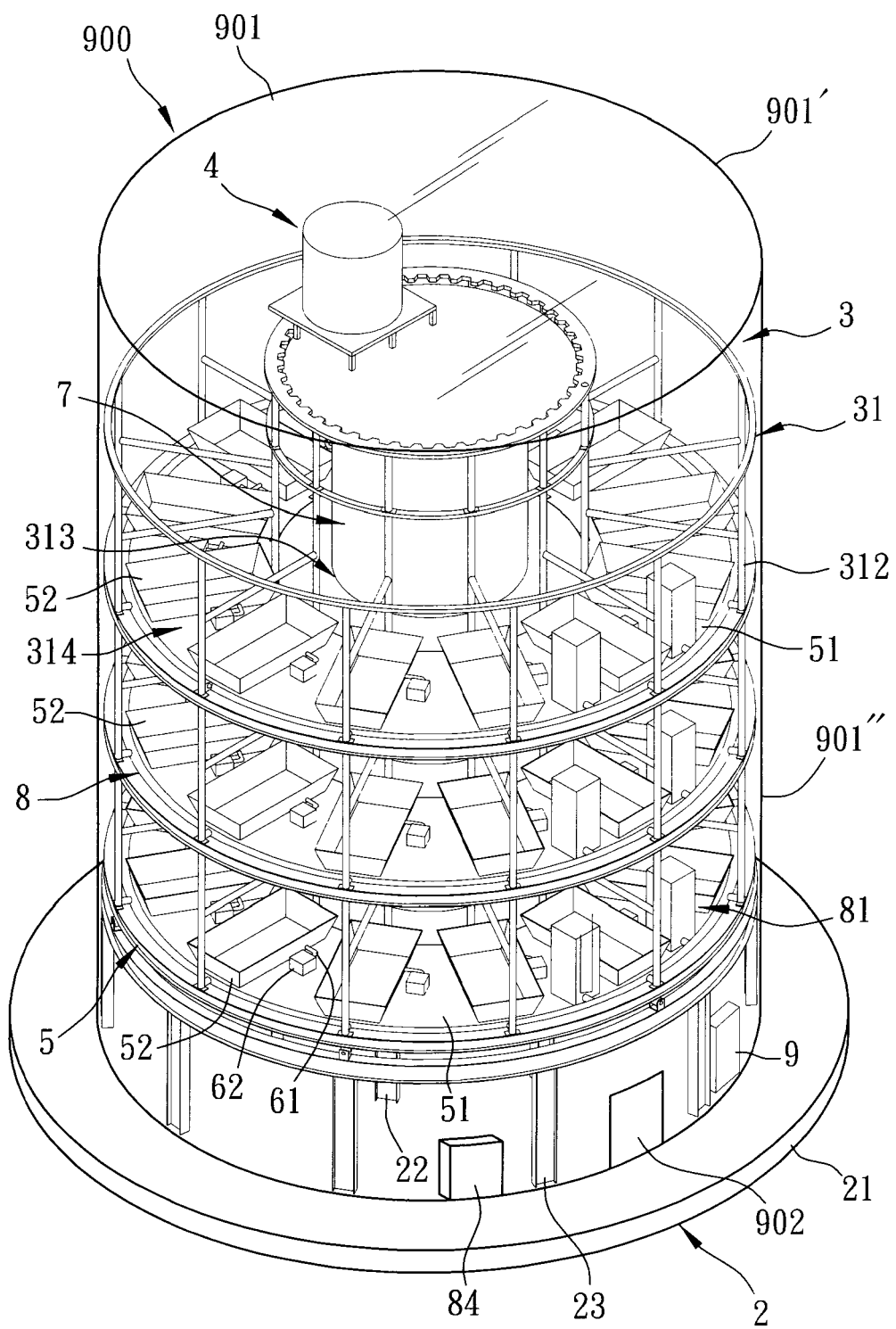
FIG. 13 is a perspective view of the second preferred embodiment of rotary type automatic agricultural cultivating equipment according to this invention.

FIG. 13 shows the second preferred embodiment of rotary type automatic agricultural cultivating equipment according to this invention. Unlike the first preferred embodiment, the equipment further includes a shielding unit 900 for covering the rotating unit 3 and the central frame 22 and the surrounding frame 23 of the supporting unit 2, and the supply unit 8 further includes an adjusting unit 84 electrically connected to the control unit 9 and operable to adjust temperature, humidity, and air flow in the cultivation region 314. The shielding unit 900 includes a shielding body 901 connected fixedly to the bottom seat 21 at a bottom end thereof, and a notch 902 formed in the bottom end of the shielding body 901. The shield body 901 has a top wall 901' disposed above the the rotating unit 3 and the central frame 22 and the surrounding frame 23 of the supporting unit 2, and a surrounding wall 901" extending downwardly from a periphery of the to wall 901' and disposed around the outer annular portion 312 of the rotating unit 3. The notch 902 is formed in the surrounding wall 901" to allow the user to move into or out of the shield body 901 therethrough. As such, the equipment looks like a greenhouse. In the mode of FIG. 13, the shield body 901 is made of glass, which has light concentration and heat collection functions. Alternatively, the shield body 901 may be configured as an insect-proof net, which has ventilation effect.

In view of the above, the rotary type automatic agricultural cultivating equipment of this invention has the following advantages:

(1) Increasing the cultivation area: As in the above-mentioned prior art, some of the loading trays 52 are spaced vertically apart from each other. The cultivating area corresponding to a limited ground surface can be increased accordingly, so that the rotary type automatic agricultural cultivating equipment is suitable for mass production of the crops 999.

(2) Convenient to monitor by a person: since each loading unit 5 co-rotates with the rotating unit 3, when the user stands at a fixed position, and the loading trays 52 planted with the crops 999 can be moved consecutively to a position disposed adjacent to and in front of the user, which can reduce movement of the user. Furthermore, when management and harvest of the crops 999 are desired, the control unit 9 can be operated to reduce the speed of the motor 41, so as to provide adequate time to facilitate easy management and harvest of the crops 999.

(3) Homogeneous growth conditions: In the above-mentioned conventional agricultural cultivating equipment, since the positions of the flowerpots 13 are different, the growth conditions (such as light absorbed, and temperature) of the crops 999 in the loading trays 52 are also different, so that the quality of the crops 900 is non-homogeneous. In the equipment of this invention, since each loading unit 5 is rotatable, the growth conditions of the crops 999 in the loading trays 52 are the same. As a result, the quality of the corps 999 produced can be improved.

(4) Automatic analysis operation: Through analysis data of the collecting unit 6, the user can realize chemical elements lacked by the crops 999. Accordingly, these chemical elements can be implemented through the supply unit 8 to prevent occurrence of diseases.

(5) Avoiding concentration of nutrient or metabolite in the culture soil in specific loading trays 52: In the above-mentioned conventional agricultural cultivating equipment, water flows downwardly from one of the flowerpots 13 into an adjacent one of the flowerpots 13, thereby affecting adversely the growth of the crops 999. In this embodiment, each water supplying device 81 can spray water onto the loading trays 52 individually, and water cannot flow downwardly from one of the loading trays 52 into an adjacent one of the loading trays 52. As such, water amount in the loading trays 52 is uniform. In other words, nutrient or metabolite cannot be concentrated in the culture soil in specific loading trays 52. Furthermore, since redundant water cannot drop from any one of the loading trays 52, a messy environment can be prevented.

With this invention thus explained, it is apparent that numerous modifications and variations can be made without departing from the scope and spirit of this invention. It is therefore intended that this invention be limited only as indicated by the appended claims.

I claim:

1. Agricultural cultivating equipment adapted for cultivating crops, said agricultural cultivating equipment comprising:

a supporting unit;

a rotating unit disposed rotatably on said supporting unit and rotatable about a vertical axis, said rotating unit having an inner annular portion, an outer annular portion disposed around and connected to said inner annular portion, an operation region defined in said inner annular portion, and a cultivation region defined between said inner and outer annular portions;

a driving unit connected to said rotating unit for driving rotation of said rotating unit relative to said supporting unit;

a loading unit including a plurality of loading plates disposed on said rotating unit and in said cultivation region and spaced vertically apart from each other, and a plurality of loading tray assemblies disposed respectively on said loading plates and each including a plurality of loading trays adapted to permit the crops to be planted therein, said loading plates being co-rotatable with said rotating unit;

an operating unit disposed on said supporting unit and in said operation region of said rotating unit and adapted to permit a user to move from said supporting unit onto a selected one of said loading plates therethrough for performing a cultivating operation on the crops;

a supply unit including a water supplying device disposed on said rotating unit for spraying water into said loading trays of said loading unit, and a plurality of lighting members disposed on said rotating unit for lighting said loading trays of said loading unit; and a control unit electrically connected to said rotating unit, said driving unit, said loading unit, said operating unit, and said supply unit and operable for controlling operation of said rotating unit, said driving unit, said loading unit, said operating unit, and said supply unit.

2. The agricultural cultivating equipment as claimed in claim 1, further comprising a collecting unit disposed on said loading unit and including a plurality of collecting tubes connected respectively to said loading trays, and a plurality of collectors connected respectively to said collecting tubes and adapted to permit liquid to flow from said loading trays into said collectors via said collecting tubes.

3. The agricultural cultivating equipment as claimed in claim 2, wherein said supply unit further includes a fertilizer supplying device disposed on said rotating unit and adapted for supplying fertilizer into said loading trays of said loading unit.

4. The agricultural cultivating equipment as claimed in claim 3, wherein said water supplying device of said supply unit includes a plurality of water conduits for guiding water flow, a plurality of water spraying members respectively in spatial communication with said water conduits for spraying water into said loading trays of said loading unit, and a plurality of water drawing members disposed respectively on said loading plates and adapted for drawing water from a water source into said water conduits, said fertilizer supplying device of said supply unit including a plurality of fertilizer conduits disposed on said rotating unit for guiding fertilizer flow, a plurality of fertilizer dispensing members respectively in spatial communication with said fertilizer conduits for spraying fertilizer into said loading trays of said loading unit, and a plurality of fertilizer drawing members disposed respectively on said loading plates and adapted for drawing fertilizer from a fertilizer source into said fertilizer conduits.

5. The agricultural cultivating equipment as claimed in claim 4, wherein said water conduits of said water supplying device of said supply unit extend respectively into said loading trays, said fertilizer conduits of said fertilizer supplying device of said supply unit extending respectively into said loading trays, said water spraying members of said water supplying device of said supply unit being disposed respectively in said loading trays, said fertilizer dispensing members of said fertilizer supplying device of said supply unit being disposed respectively in said loading trays.

6. The agricultural cultivating equipment as claimed in claim 1, wherein said supply unit further includes an adjusting unit electrically connected to said control unit, such that said control unit is operable to adjust temperature, humidity, and air flow in said cultivation region.

7. The agricultural cultivating equipment as claimed in claim 1, wherein each of said loading trays of said loading unit has an inclined top surface that has an inner end proximate to said operation region, and an outer end distal from said operation region and higher than said inner end.

8. The agricultural cultivating equipment as claimed in claim 7, wherein said supporting unit includes an annular central frame, an annular surrounding frame disposed around and spaced apart from said central frame, and a plurality of rollers disposed between said central frame of said supporting unit and said inner annular portion of said rotating unit and between said surrounding frame of said supporting unit and said outer annular portion of said rotating unit, said driving unit including a motor, a driving gear driven by said motor, and an internal gear connected fixedly to said inner annular portion of said rotating unit and meshing with said driving gear so as to transfer rotation of said driving gear to said rotating unit.

9. The agricultural cultivating equipment as claimed in claim 8, further comprising a shielding unit: said shielding unit including a shielding body covering said rotating unit and said central frame and said surrounding frame of said supporting unit, and a notch formed in a bottom end of said shielding body and adapted to allow the user to move into or out d said shielding body therethrough, said supporting unit further including a bosom seat connected fixedly to said bottom end of said shielding body, bottom ends of said central frame and said surrounding frame of said supporting unit being disposed fixedly on said bottom seat.

10. The agricultural cultivating equipment as claimed in claim 7, wherein said operating unit: includes a plurality of spaced-apart platforms disposed in said operation region and adjoining said loading plates, respectively, and an elevator adapted for transporting the user to a selected one of said platforms.

* * * * *